United States Patent
Hory

(10) Patent No.: US 8,627,685 B2
(45) Date of Patent: Jan. 14, 2014

(54) METHOD FOR MELTING AT LEAST ONE POWDERED MINERAL MATERIAL

(75) Inventor: Arnaud Hory, Verneuil sur Vienne (FR)

(73) Assignee: Cerlase, Limoges (FR)

( * ) Notice: Subject to any disclaimer, the term of this patent is extended or adjusted under 35 U.S.C. 154(b) by 98 days.

(21) Appl. No.: 13/148,565

(22) PCT Filed: Feb. 17, 2010

(86) PCT No.: PCT/FR2010/050263
§ 371 (c)(1),
(2), (4) Date: Aug. 9, 2011

(87) PCT Pub. No.: WO2010/094885
PCT Pub. Date: Aug. 26, 2010

(65) Prior Publication Data
US 2011/0308278 A1  Dec. 22, 2011

(30) Foreign Application Priority Data
Feb. 18, 2009 (FR) ....................... 09 51058

(51) Int. Cl.
*C03B 5/16* (2006.01)
*C03B 5/235* (2006.01)
(52) U.S. Cl.
CPC ............. *C03B 5/235* (2013.01); *C03B 2211/00* (2013.01)
USPC ........................................... 65/135.9; 373/10
(58) Field of Classification Search
CPC ........ C03B 5/00; C03B 2211/00; C03B 5/12; C03B 5/235
USPC .......... 65/21.2, 135.9; 110/165 R; 373/10, 27
See application file for complete search history.

(56) References Cited

U.S. PATENT DOCUMENTS

| | | | |
|---|---|---|---|
| 3,244,412 A * | 4/1966 | Robinson et al. | 432/198 |
| 3,762,961 A * | 10/1973 | Metz et al. | 148/565 |
| 4,300,474 A | 11/1981 | Livsey | |
| 6,532,768 B1 | 3/2003 | Labrot et al. | |
| 7,428,827 B2 * | 9/2008 | Maugendre et al. | 65/121 |
| 2003/0110708 A1 * | 6/2003 | Rosenflanz | 51/307 |
| 2009/0235695 A1 * | 9/2009 | Pierrot et al. | 65/356 |

FOREIGN PATENT DOCUMENTS

| | | |
|---|---|---|
| EP | 0 406 796 A1 | 1/1991 |
| FR | 2 764 877 A1 | 12/1998 |
| JP | 60 221332 A | 11/1985 |
| JP | 2002293574 A | 10/2002 |
| SU | 1 636 352 A1 | 3/1991 |
| WO | 2008/057483 A2 | 5/2008 |
| WO | 2008095204 A1 | 8/2008 |

OTHER PUBLICATIONS

International Search Report, dated Jun. 2, 2010, from corresponding PCT application.

* cited by examiner

*Primary Examiner* — Matthew Daniels
*Assistant Examiner* — Cynthia Szewczyk
(74) *Attorney, Agent, or Firm* — Young & Thompson

(57) ABSTRACT

A process for melting at least one mineral material in powder form includes using at least one laser beam (12) for supplying the energy necessary to the melting, and gradually supplying mineral powder to a zone (10) that is impacted by the laser beam(s) so as to obtain the largest surface possible for interaction between the material and the laser beam(s).

8 Claims, 1 Drawing Sheet

METHOD FOR MELTING AT LEAST ONE POWDERED MINERAL MATERIAL

Figure 1:
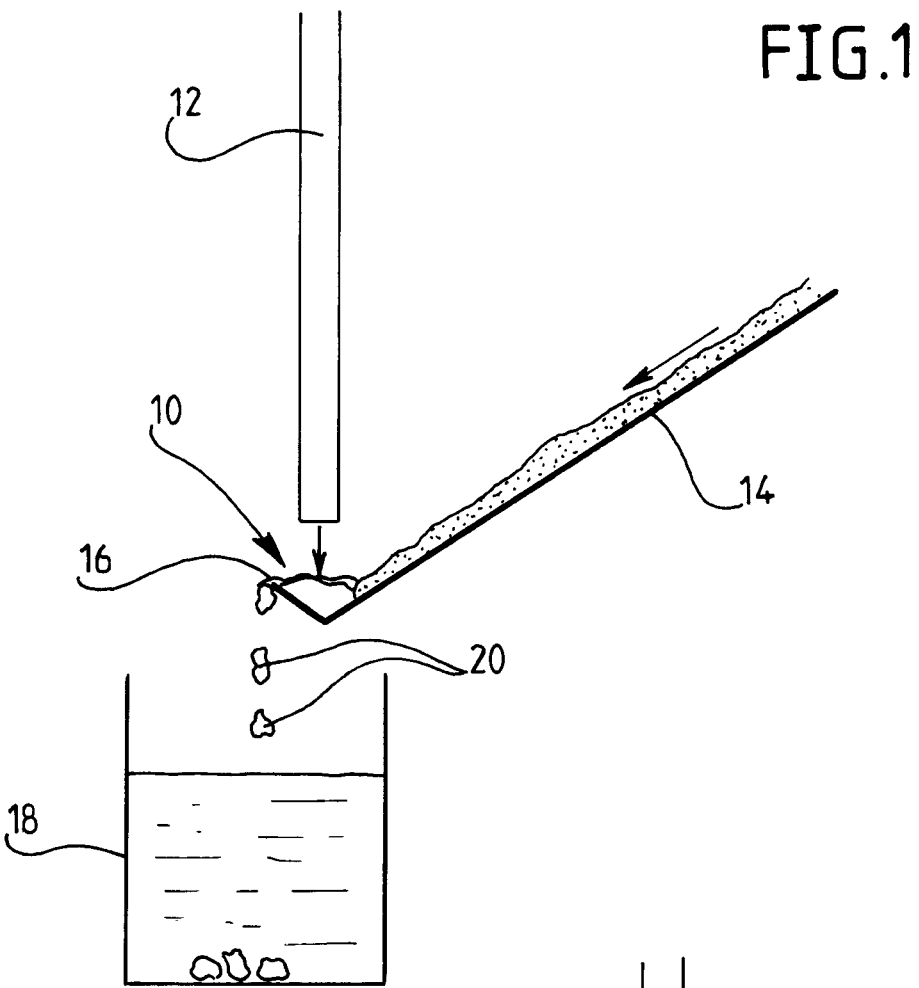

This invention relates to a process for melting at least one mineral material in powder form as well as a device for its implementation. According to one non-limiting application, the invention relates to a process for manufacturing a glass frit.

The process for manufacturing glass and the process for manufacturing a glass frit comprise common stages consisting in mixing vitrifiable raw materials and in melting this mixture in a furnace at a high temperature on the order of 1400° to 1500° C.

Following this melting, in the case of a glass frit, the molten mixture is cooled very quickly by quenching, generally in cold water. After drying, the solid mixture is ground and then sieved so as to obtain a powder that is a glass frit.

In the case of one glass, the latter is shaped under hot conditions and then annealed before being cooled.

Prior to the shaping in the case of a glass or prior to the quenching in the case of a glass frit, the vitrifiable mixture is subjected successively to:
- A melting phase of 800° to 1400° C. during which the solid material transforms into molten glass causing releases of gas and the formation of gas bubbles,
- A refining phase of 1450° to 1530° C. whose purpose is to eliminate the gas bubbles by the raising of the temperature to liquefy the glass and by the addition of a refining agent such as, for example, sodium sulfate to increase the size of the gas bubbles,
- A heat conditioning phase during which the temperature of the molten glass is reduced to a temperature on the order of 1000° C. for adapting the viscosity of the molten mixture to shaping, the last gas bubbles rising to the surface.

The mixture of vitrifiable raw materials comprises silica as well as different oxides.

To lower the melting point of the mixture and thus to reduce the energy requirements, the mixture of vitrifiable raw materials comprises fluxes (alkaline oxides) that make it possible to lower the melting point to approximately 1400° C. As flux, it is possible to cite sodium oxide (soda), potassium oxide, or magnesium oxide. The same glass can combine several fluxes, for example soda and lime for obtaining a so-called sodo-calcic glass or soda and lead for obtaining crystal.

To reduce the energy requirements, the document WO2008/095204 describes a stage prior to melting consisting in grinding the vitrifiable raw material so as to reduce the grain size of the mixture before melting and to homogenize the mixture so as to reduce the time necessary for the homogenization of the molten mass.

According to one intermittent-type production method, for the melting of glass frits, a pot furnace is used for melting the mixture of raw materials in powder form. In this case, the mixture is placed in a crucible that is arranged in a furnace that operates with a fossil fuel, gas or fuel. After the different melting phases, the liquid mixture is cooled quickly to achieve quenching by dumping it into the water.

This solution is not satisfactory because it requires a large amount of energy and regularly changing the pots that are made of refractory materials, with the liquid mixture being very corrosive.

In the case of glass, it is possible to use tank furnaces that are made of refractory materials and that form a tank that can hold up to 2,500 tons of glass 1.50 m thick. These tanks use burners that operate with a fossil fuel for raising the temperature and holding it at that level. As a variant, certain furnaces can be of the electric type with the energy diffused directly into the melting glass that conducts heat from 250° C.

The mixture of vitrifiable raw materials is incorporated in a first end of the furnace in an already molten mixture, and in moving toward the drain, this mixture gradually becomes homogenized and refined.

As above, this solution is not fully satisfactory because it requires a large amount of energy and can only operate with a large quantity of molten material.

According to the energy that is used, the melting of one kilogram of glass requires 0.2 Kg of fuel or 1 KWh for electric furnaces.

According to the document WO2008/057483, a process is also known for producing a densified form from a silicon powder. According to this document, the dried silicon powder is deposited on a substrate with hollow shapes adapted to the desired densified form of silicon. This solution only makes it possible to obtain densified forms with small volumes. Actually, if the volume of the hollow forms increases, the densified form is not homogeneous and comprises numerous inclusions of gas.

Also, the purpose of this invention is to overcome the drawbacks of the prior art by proposing a process for melting at least one mineral material in powder form that makes it possible to reduce the energy consumption and to obtain a homogeneous product.

For this purpose, the invention has as its object a process for melting at least one mineral material in powder form that consists in using at least one laser beam to supply the energy necessary to the melting, characterized in that it consists in gradually supplying in mineral powder the zone that is impacted by the laser beam(s) so as to obtain the largest surface possible for interaction between the material and the laser beam(s).

According to one particular application, the invention has as its object a process for manufacturing a glass frit that is developed from a mixture of vitrifiable raw materials in powder form comprising stages for melting said mixture, rapid cooling of said molten mixture, and grinding of said cooled and solid mixture, characterized in that it consists in using at least one laser beam to provide the energy that is necessary to the melting of the mixture of vitrifiable raw materials and to gradually supply the zone that is impacted by the laser beam(s) in a mixture in powder form.

Figure 2:
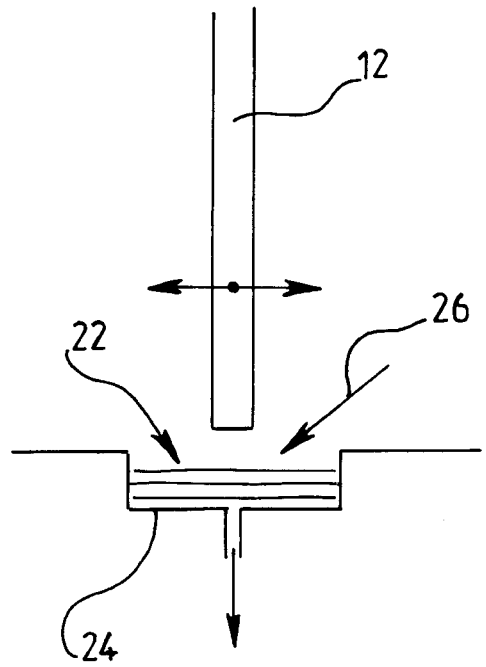

Other characteristics and advantages will emerge from the following description of the invention, a description that is provided only by way of example, relative to the accompanying drawings in which:

FIG. 1 is a diagram that illustrates a first variant of the melting process of at least one mineral powder, and FIG. 2 is a diagram that illustrates another variant of the process for melting at least one mineral powder.

In a known manner, a glass frit is produced from a mixture of vitrifiable raw materials in powder form.

This mixture essentially comprises silica and oxides.

A distinction is made between the three types of oxides, namely the network-forming oxides, the network-modifying oxides, and the intermediate oxides.

The network-forming oxides are essential for the formation of the vitreous network. By way of example, the most common network-forming oxides are the following: $SiO_2$, $B_2O_3$, $P_2O_5$, $GeO_2$, $V_2O_5$, and $As_2O_3$.

The network-modifying oxides cannot form the vitreous network by themselves and are essentially alkaline oxides or alkaline-earth oxides, for example $Li_2O$, $Na_2O$, $K_2O$, $CaO$, $MgO$ and $BaO$. Among the network-modifying oxides, a distinction is made between the fluxes that lower the melting point of the forming oxides and the stabilizers that modify the physical properties of glass attenuated by the addition of the flux(es).

The fluxes consist of alkaline oxides. By way of example, it is possible to cite sodium oxide, potassium oxide, and magnesium oxide.

The stabilizers consist of alkaline-earth oxides, and their purpose is to attenuate the effects of the fluxes, which tend to embrittle the network. By way of example, it is possible to cite calcium oxide, zinc oxide, iron oxide, and lead oxide.

The intermediate oxides have different behaviors. Some can be formers or modifiers based on the composition of the vitrifiable mixture. Others will have neither one nor the other of these functions but an intermediate role. By way of example, it is possible to cite $Al_2O_3$, PbO, ZnO, CdO, and $TiO_2$ as intermediate oxides.

The process for developing a glass frit comprises the stages that consist in determining the nature of the components and their quantities, homogenizing the mixture of raw materials, melting said mixture, very quickly cooling the molten mixture by quenching, and then grinding the solidified mixture.

According to the invention for melting the mixture, a laser beam that provides a sufficient amount of energy is used to raise the temperature and melt the mixture.

According to an important characteristic of the invention, the melting of the mixture is implemented continuously. Thus, a supply of a mixture is made available that gradually provides the mineral powder or the mixture of mineral powders at the zone that is impacted by the laser beam.

Thus, the presence of powder at the zone that is impacted by the laser beam makes it possible to increase the surface area that is used in the absorption of energy provided by said laser beam. This better absorption of the energy of the laser beam makes it possible to obtain a higher temperature that tends to reduce the viscosity of the mixture and facilitates the evacuation of gas bubbles.

Thanks to this solution, a process for melting at least one mineral powder is obtained that makes it possible to reduce the energy consumption and to obtain a homogeneous product.

According to one characteristic of the invention, the laser beam is to transmit to the material an amount of energy that is greater than or equal to 50 $W/cm^2$.

By way of example, it is possible to use a $CO_2$-type laser that operates with a wavelength on the order of 10.6 μm.

According to an embodiment that is illustrated in FIG. 1, the device for manufacturing a glass frit comprises a hollow zone 10 in the direction of which a laser beam 12 is directed. As appropriate, the laser beam may or may not be focused.

Upstream from this hollow zone 10, the device comprises a zone for supplying—in a mixture—vitrifiable raw materials in powder form. This supply zone consists of an inclined plane 14 over which flows a bed of a mixture of raw materials in powder form with a preferably essentially constant flow rate. An endless screw can be provided for helping the flow achieved by gravity or causing the flow of the mixture of vitrifiable raw materials with an essentially constant flow rate. At the hollow zone 10, the laser beam 12 produces the melting of the portion of the mixture of vitrifiable raw materials present at this moment.

According to this variant, the impacted zone is supplied continuously in powder by gravity.

The molten mixture is gradually drained at an overflow 16 that is located opposite the inclined plane, dropping into a reservoir 18 in which a liquid, in particular water, is present for quickly cooling the molten mixture by quenching. The drainage of the molten mixture is done in a natural manner in the form of drops 20 that solidify by dropping into the reservoir 18.

The solidified drops are next dried and then ground to obtain a glass frit that will next be used for developing enamel.

The process according to the invention makes it possible to achieve a melting of the mixture of vitrifiable materials continuously and to essentially reduce the necessary energy consumption.

According to another advantage, this solution makes it possible to reduce the quantity of bubbles in the molten mixture. In addition, it is noted that the parts of the device that are in contact with the melting mixture that can be changed are small unlike the pots used according to the prior art.

According to another characteristic of the invention, the device can comprise means for controlling the power of the laser. For this purpose, it is possible to provide means for measuring the temperature of the mixture at the hollow zone 10 and controlling the power of the laser beam 12. According to one embodiment, the means for measuring the temperature come in the form of a thermal camera. Taking into account the low volume of melting material and therefore its low inertia, it is possible to regulate the power of the laser with precision and with a high reactivity.

The invention is not limited to this application and may be suitable for all of the processes that comprise a stage for melting at least one mineral material in powder form.

According to the variants, the laser beam can be stationary or mobile and in this case can sweep a zone.

As appropriate, the device can comprise means for modulating the geometry of the laser beam spot or the distribution of energy at the spot. Likewise, the device can comprise several beams so as to obtain a spot that originates from the superposition of several spots.

According to a first variant, the hollow zone 10 can have a V-shaped cross-section along a vertical plane as illustrated in FIG. 1.

According to another variant, the device can comprise a hollow zone 22 with an essentially circular cross-section along a horizontal plane, as illustrated in FIG. 2. In this case, the bottom 24 of the hollow zone can be flat, as illustrated in FIG. 2. The device comprises means 26 for gradually supplying the hollow zone 22. The powder can be dumped continuously on the zone that is impacted by the laser beam 12, for example using an inclined plane or an endless screw. As a variant, the powder can be placed layer by layer at the zone that is impacted by the laser beam 12 using, for example, a scraper.

As appropriate, the bottom 24 of the hollow zone can be movable and gradually descend to accumulate successive layers of molten powder.

According to another possibility illustrated in FIG. 2, the bottom 24 can comprise drainage of the melting material to another part of the chain of production, for example means for shaping the glass.

Advantageously, the device comprises means for generating turbulence in the melting mixture for homogenizing it, for example by vibration or movement of the hollow zone, by a difference in pressure or in the temperature of the mixture.

For this purpose, means for emitting vibrations in the melting material can be provided so as to facilitate the evacuation of gas bubbles and to obtain a homogeneous material.

According to one embodiment, the hollow zone 10 can be connected to a vibrating element or connected to a vibrating support.

It is also possible to combine at least two laser beams with different angles of incidence to homogenize the temperature gradient.

Finally, it is possible to use the mixture to be melted to shape a hollow form in the manner of an auto-crucible.

The invention claimed is:

1. A process for manufacturing a glass frit, the process comprising the steps of:
melting a mixture of vitrifiable raw materials in powder form by using a laser beam to provide an amount of energy to melt the mixture, said melting step including
placing the mixture in a hollow zone of a manufacturing device,
directing the laser beam in a direction of the hollow zone so that an upper surface of the mixture in the hollow zone is impacted by the laser beam to create a melting mixture with a molten mixture of the vitrifiable raw materials obtained at an overflow of the hollow zone,
while impacting the upper surface of the mixture with the laser beam, over an inclined plane continuously supplying the hollow zone with further vitrifiable raw materials in powder form,
using an overflow located opposite the inclined plane, draining the molten mixture of the vitrifiable raw materials into a reservoir,
cooling the drained molten mixture of the vitrifiable raw materials in the reservoir by quenching with a liquid in the reservoir to form a solid mixture of the vitrifiable raw materials; and
grinding of said solid mixture of the vitrifiable raw materials to obtain the glass frit.

2. The process of claim 1, wherein said amount of energy is greater than or equal to 50 W/cm$^2$.

3. The process of claim 1, further comprising the step of:
maximizing the upper surface of the mixture in the hollow zone impacted by the laser beam by, through said continuously supplying step gradually supplying the further vitrifiable raw materials to the upper surface of the mixture in the hollow zone being impacted by the laser beam.

4. The process of claim 1, wherein said continuously supplying step supplies the hollow zone with the further vitrifiable raw materials by moving the further vitrifiable raw materials along the inclined plane using gravity.

5. The process of claim 4, further comprising the step of:
using an endless screw for calibrating a flow rate of the mixture of the further vitrifiable raw materials in powder form.

6. The process of claim 4, further comprising the step of:
homogenizing the melting mixture by generating turbulence in the melting mixture.

7. The process of claim 1, wherein the liquid quenching the drained molten mixture is water.

8. The process of claim 1, wherein said amount of energy is greater than or equal to 50 W/cm$^2$ and is from a $CO_2$ laser operating with a wavelength on the order of 10.6 μm.

* * * * *

UNITED STATES PATENT AND TRADEMARK OFFICE
CERTIFICATE OF CORRECTION

PATENT NO.        : 8,627,685 B2                                        Page 1 of 1
APPLICATION NO.   : 13/148565
DATED             : January 14, 2014
INVENTOR(S)       : Arnaud Hory It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 100 days.

Signed and Sealed this
Twenty-second Day of September, 2015

Michelle K. Lee
*Director of the United States Patent and Trademark Office*